United States Patent
Gere (10) Patent No.: US 7,881,603 B2
(45) Date of Patent: Feb. 1, 2011

(54) DICHROIC APERTURE FOR ELECTRONIC IMAGING DEVICE

(75) Inventor: David S. Gere, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 169 days.

(21) Appl. No.: 12/239,547

(22) Filed: Sep. 26, 2008

(65) Prior Publication Data

US 2010/0079884 A1    Apr. 1, 2010

(51) Int. Cl.
  *G03B 11/00*    (2006.01)
  *H04N 5/232*    (2006.01)
  *G02B 5/22*     (2006.01)
  *G02B 5/23*     (2006.01)

(52) U.S. Cl. .................. 396/275; 348/342; 359/722

(58) Field of Classification Search .......... 396/275, 396/50; 348/42, 61, 222.1, 342; 359/722
See application file for complete search history.

(56) References Cited

U.S. PATENT DOCUMENTS

| | | | |
|---|---|---|---|
| 5,272,473 A | 12/1993 | Thompson et al. | 345/7 |
| 5,337,081 A * | 8/1994 | Kamiya et al. | 348/61 |
| 6,561,654 B2 | 5/2003 | Mukawa et al. | 353/31 |
| 6,636,292 B2 | 10/2003 | Roddy et al. | 355/32 |
| 6,807,010 B2 | 10/2004 | Kowarz | 359/634 |
| 7,079,707 B2 | 7/2006 | Baron | 382/289 |
| 7,413,311 B2 | 8/2008 | Govorkov et al. | 353/34 |
| 7,590,335 B2 | 9/2009 | Kobayashi et al. | 396/50 |
| 2005/0168583 A1 | 8/2005 | Thomason | 348/208.4 |
| 2006/0197843 A1 | 9/2006 | Yoshimatsu | 348/219.1 |
| 2008/0131107 A1 | 6/2008 | Ueno | 396/50 |
| 2009/0051797 A1 | 2/2009 | Yao | 348/308 |
| 2009/0273679 A1 | 11/2009 | Gere et al. | 348/187 |
| 2010/0060803 A1 | 3/2010 | Slack et al. | 348/744 |
| 2010/0061659 A1 | 3/2010 | Slack et al. | 382/295 |
| 2010/0073499 A1 * | 3/2010 | Gere | 348/222.1 |
| 2010/0079426 A1 | 4/2010 | Pance et al. | 345/207 |
| 2010/0079468 A1 | 4/2010 | Pance et al. | 345/501 |
| 2010/0079653 A1 | 4/2010 | Pance | 348/333.1 |
| 2010/0083188 A1 | 4/2010 | Pance et al. | 715/863 |

* cited by examiner

*Primary Examiner*—Rochelle-Ann J Blackman
(74) *Attorney, Agent, or Firm*—Dorsey & Whitney LLP (57) ABSTRACT

A dichroic filter that for use with an electronic imaging device, such as a camera. The dichroic filter is located in the main imaging lens, and may permit all light to pass through a first portion and be measured by a photosensor, while restricting at least some portions of visible light from passing through a second portion thereof. In this manner, only the non-restricted portions of visible light passing through the second portion may be measured by the associated pixels of the photosensor. The filter may be formed from a first aperture permitting a first set of wavelengths to pass therethrough and a second aperture adjacent the first aperture, the second aperture permitting only a subset of the first set of wavelengths to pass therethrough. The second aperture may be a dichroic mirror or it may be an optical filter of some other type.

16 Claims, 5 Drawing Sheets

DICHROIC APERTURE FOR ELECTRONIC IMAGING DEVICE

TECHNICAL FIELD

The present invention relates generally to imaging devices, and more particularly to an imaging device, such as a camera or video camera, having a dichroic aperture or filter.

BACKGROUND

The continuing decrease in manufacturing costs of electronic imaging devices, combined with increasing functionality and enhanced user interfaces, have led to increased and widespread usage. Electronic cameras and video cameras are found not only as freestanding devices used to document trips and preserve memories, but also for communication. For example, such devices may be incorporated into computers or used as computing peripherals to permit video conferencing, video chatting and so on.

Most electronic imaging devices employ a photosensor made of a grid of light-sensitive pixels. These pixels may measure the intensity of light impacting them. By aggregating these measurements, images may be created. However, the individual pixels generally are poor at sensing or reporting particular colors of light. Accordingly, a filter may be used to restrict the colors that impact any given pixel. As one example, a Bayer filter is often used to limit light impacting each pixel to red, green or blue light.

Given that each pixel only senses a particular color of light and the positions of each such pixel are known, color data may be extrapolated from constituent red, green and blue images formed by those pixels sensing each respective color. In this manner, color images may be created.

However, conventional single-chip color image sensors typically have fewer pixels dedicated to sensing red and blue image planes as compared to the green image plane, since red and blue light contributes less to the human eye's overall perception of resolution (e.g., luminance) than does green light. Further, many present color image sensors must strike a balance between resolution and noise in a picture. As resolution increases, so too may noise. This, in turn, leads to degradation and artifacting of the color image.

SUMMARY

Generally, one embodiment of the present invention takes the form of a dichroic filter that may be used with an electronic imaging device, such as a camera. The dichroic filter may permit all light to pass through a first portion and be measured by a photosensor, while restricting at least some portions of visible light from passing through a second portion thereof. In this manner, only the non-restricted portions of visible light passing through the second portion may be measured by the associated pixels of the photosensor.

Another embodiment may be a filter for a camera or other electronic imaging device, comprising: a first aperture permitting a first set of wavelengths to pass therethrough; and a second aperture adjacent the first aperture, the second aperture permitting only a subset of the first set of wavelengths to pass therethrough. In such an embodiment, the second aperture may encircle the first aperture. Further, the first set of wavelengths may be wavelengths from approximately 400 to 750 nanometers (nm). Similarly, the subset of the first set of wavelengths may range from approximately 400 to 495 nm. In certain embodiments, the second aperture may be a dichroic mirror. The embodiment may be integrated into the camera; as one example the embodiment may be the main lens of the camera or a portion thereof, such as the aperture. An alternative embodiment may be detachable from the imaging device. For example, such an embodiment may be a filter or specialty lens that is attached to the camera as necessary, and may either overlie or take the place of the standard lens.

Still further, in certain embodiments such as the foregoing the photosensor may be made of a grid of light-sensitive pixels and a filter array overlying at least a portion of the grid. The filter array may permit only wavelengths corresponding to certain colors to reach individual pixels of the grid; each pixel may be overlaid by a part of the filter that permits only wavelengths of a single color type to impinge upon (and so be detected by) the pixel. For example, the filter array may be a Bayer filter.

In addition, yet other embodiments may have an aperture with first and second segments as previously defined, but also including a third segment defining a third set of light-transmissive properties and permitting only red light to pass therethrough. In such embodiments, the third segment may encircle the first segment and the second segment encircle the third segment. Further, the second and third segments may define dichroic mirrors.

DETAILED DESCRIPTION

Generally, one embodiment of the present invention may take the form of a dichroic element used by or incorporated into an imaging device. For example, one embodiment may be a filter having dichroic properties and designed to fit over a lens of a camera. Yet another embodiment may be a camera having an integral dichroic filter, lens, or so forth. An "imaging device," as used herein, is any device that may electronically capture an image, such as a camera, video recorder and so forth. The imaging device may be incorporated into any number of electronic components, including a computer, portable computing device, mobile telephone, and so forth, or may stand alone.

A "dichroic" element, such as the aforementioned filter and lens, is one that treats, passes or filters different wavelengths of light differently. A dichroic lens or filter generally defines two areas on the surface of the lens/filter, each of which passes a unique spectrum of wavelengths of visible light. As one non-limiting example, a dichroic lens or filter may define two concentric areas, such as a first circular area and a second annular area encircling the circular area or portion. The circular area may transmit all visible light to a sensor associated with the filter, while the annular portion may transmit only wavelengths corresponding to the blue segment of the visible light spectrum. That is, the annular portion may pass only light having a wavelength of approximately 440 to 490 nanometers to the sensor ("blue light"). Thus, since the annular segment encircles and abuts the circular area, the sensor may sense blue light through a larger aperture than it senses other wavelengths. References to "red light" and/or "green light" are intended to encompass those portions of the spectrum commonly making up the given colors, rather than a single, particular wavelength.

For purposes of simplicity, reference made herein to a dichroic "filter" encompasses both a lens and a filter, as appropriate. Likewise, insofar as this document generally discusses a dichroic filter/aperture for use with an imaging device, it should be understood that any such imaging device may natively incorporate the filter or may employ the filter as an add-on element.

Figure 1:
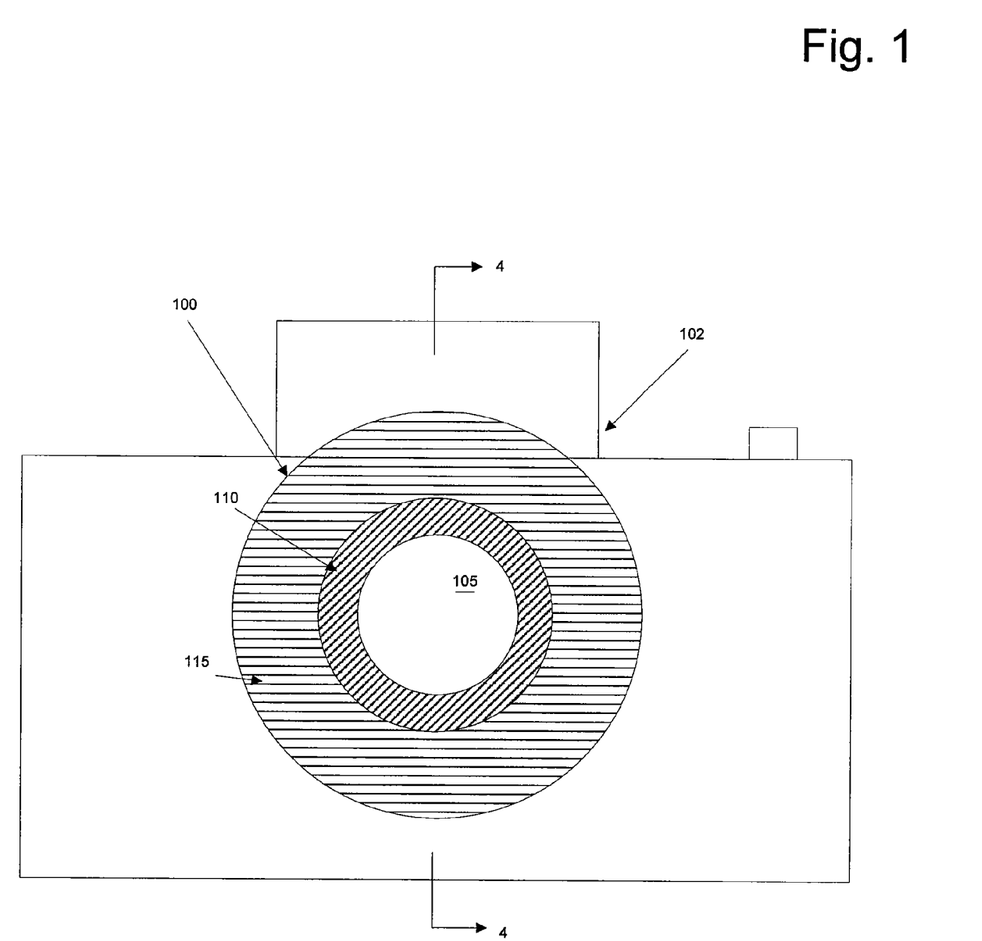
FIG. 1 is a top-down view of a first embodiment of the present invention.
Figure 2:
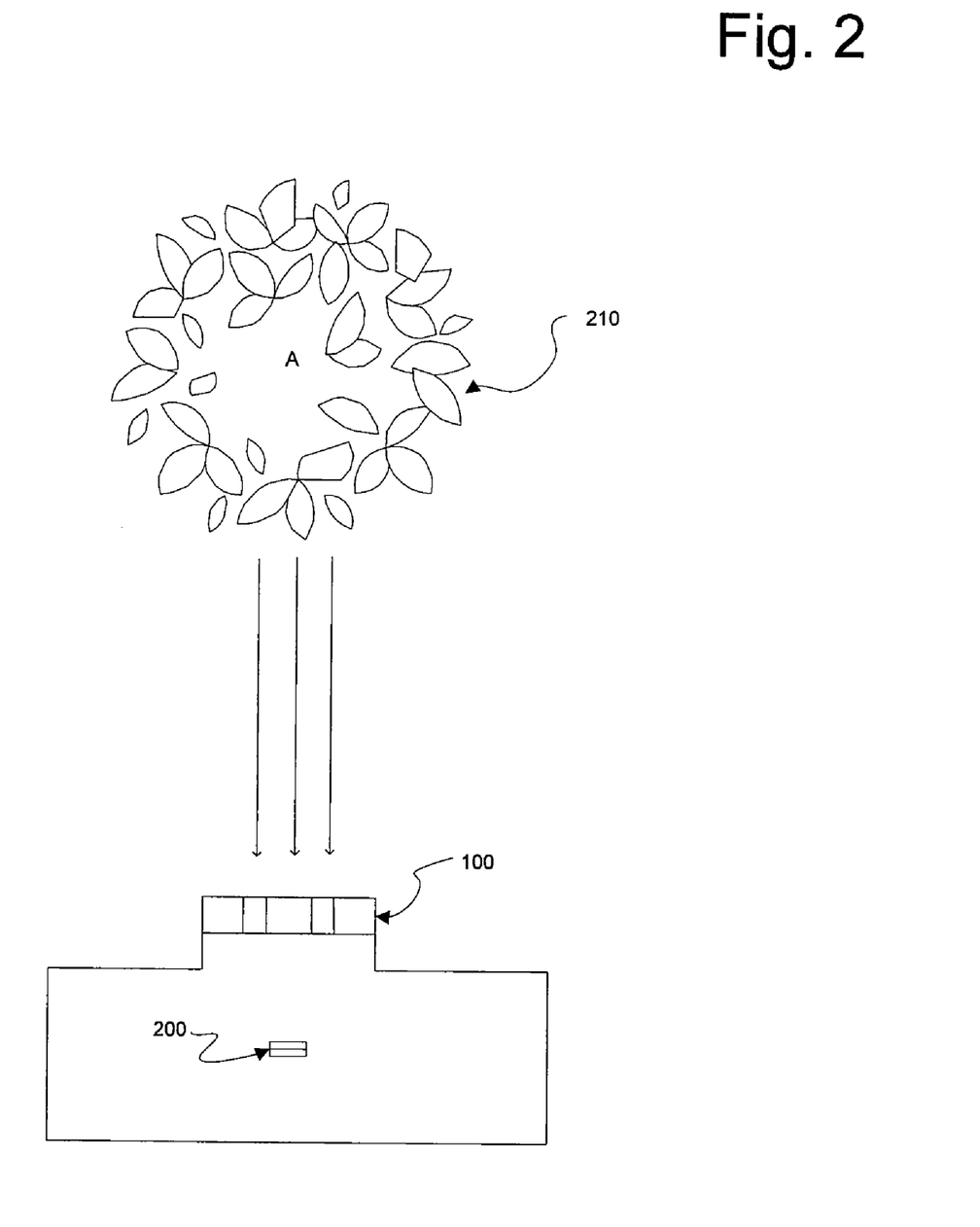
FIG. 2 is a cross-sectional view of a portion of the embodiment of FIG. 1 in a sample operating environment.

FIG. 1 generally depicts a top-down view of a first embodiment taking the form of a dichroic filter 100 incorporated into an electronic imaging device 102, while FIG. 2 shows a cross-sectional side view of the same filter. It should be noted that FIGS. 1 and 2 show the filter 100 formed on, or as, the main lens of the electronic imaging device 102. In alternative embodiments, however, the filter 100 may be a removable lens or aperture that is releasably attached to the imaging device. The filter 100 includes a circular or round segment 105, a second annular segment 110 encircling (and typically abutting the circular segment), and an exterior segment 115 surrounding the annular segment. (For reference, the terms "segment," "portion" and "section" are generally used interchangeably herein). Each portion of the filter has different light-transmissive properties, as described in more detail below. The shading shown in FIG. 1 and subsequent figures is provide only to enhance visual perception of the various elements and is not intended to represent any requirement, coloring or physical property of the embodiment or any portion thereof. Likewise, although the exterior portion 115 is shown as being round, in many embodiments it may be square, oval, or take any other shape, as may the circular segment 105 and second annular segment 110. Similarly, for both FIG. 1 and following figures showing various embodiments, the figures are intended as representative and not exact. Thus, the figures do not represent exact proportions between constituent elements.

As shown in FIG. 2, the filter 100 generally is positioned between an electronic sensor 200 and an object 210, such that light reflects off the object 210, passes through the filter 100 and impacts the sensor 200. The sensor may be any electronic sensor capable of detecting various wavelengths of light, such as those commonly used in digital cameras, digital video cameras, mobile telephones and personal digital assistants, web cameras and so forth. Typically, such cameras employ a sensor formed from an array of color-sensitive pixels. That is, each pixel of the sensor 200 may detect at least one of the various wavelengths that make up visible light; the signal generated by each such pixel varies depending on the wavelength of light impacting it so that the array may thus reproduce an image of the object 210.

Figure 3:
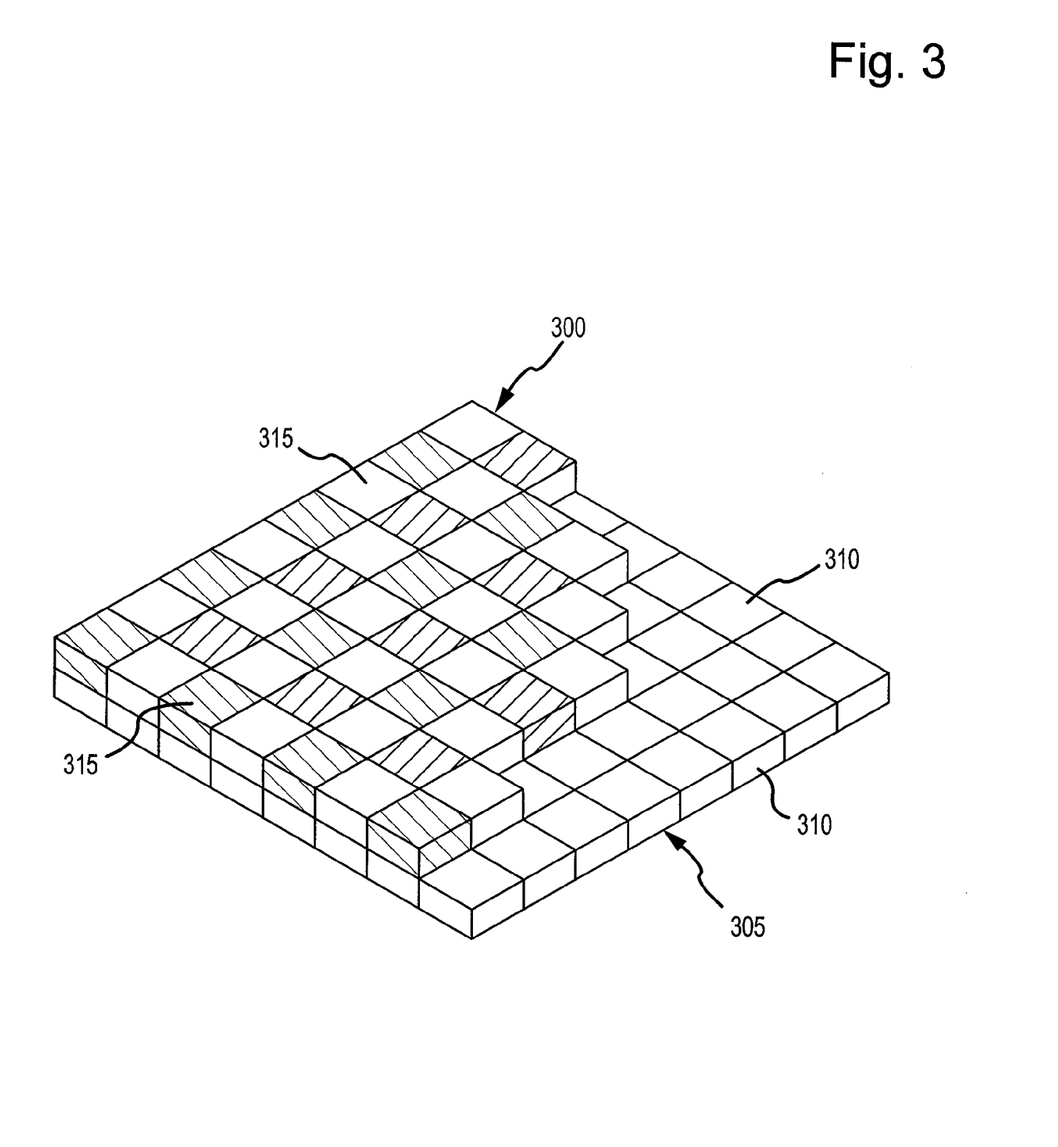
FIG. 3 depicts a Bayer filter array and photosensor.

Often, the sensor 200 uses a filter with a Bayer array 300 overlaying the photosensor 305, as shown in FIG. 3. In a Bayer array 300, the sample rate (e.g., number of samples per unit of area) is twice as high for green light wavelengths as red or blue light wavelengths. That is, a standard Bayer filter array has a filter pattern that is 50% green, 25% red and 25% blue, where each color in the filter permits that light, and only that light, to pass therethrough. Each pixel 310 of the photosensor 305 is overlaid by a pixel 315 of the Bayer array 300; each Bayer pixel 315 filters all but one wavelength of light. Thus, 50% of the pixels forming the array of the image sensor detect only green light because the green portion of the Bayer filter overlies them, 25% detect only red light because the red portion of the Bayer filter overlies them, and 25% detect only blue light because the blue portion of the Bayer filter overlies them. Bayer filters 300 are commonly used with digital cameras and other image-capturing or photosensitive devices. In FIG. 3, the blue pixels are shown with a first shading pattern and the red pixels with a second shading pattern while the green pixels are unshaded. Further, it should be understood that only a portion of the exemplary filter array 300 is shown in order to expose some pixels 310 of the underlying photosensor 305.

This array is designed to generally mimic the perception of the human eye, which is roughly twice as sensitive to green light as to either red or blue light. Thus, the sensor may detect luminance in approximately the same manner as the human eye. Luminance may be expressed as a weighted sum of red, green and blue wavelengths in the following manner:

$$L=0.59G+0.3R+0.11B$$

Where L is luminance, G is green light, R is red light and B is blue light. Accordingly, green light is the major component of luminance for the aforementioned Bayer sensor 200 and the human eye.

Insofar as green light wavelengths contribute approximately six times as much to luminance as blue light wavelengths, both the human eye and the sensor 200 depend much more on green light than red or blue light to determine sharpness or resolution of an image. Given this relationship, the blue portion of an electronically-sensed image may be of lower resolution than the green portion without significantly affecting overall image sharpness.

Likewise, by increasing the signal level of the blue portion of an image while maintaining the signal levels of the red and green portions, the overall signal level of the image may be enhanced. One way to increase blue signal level is by employing a lens with a dichroic filter 100, as shown in FIG. 1. The dichroic filter defines two different areas 105, 110 that permit light to pass therethrough and impinge upon a sensor located behind the filter. The sensor may be a photosensor overlaid with the aforementioned Bayer filter. Alternatively, the sensor may be a photosensor overlaid with a filter such as a CYGM (cyan, yellow, green, magenta) or RGBE (red, green, blue, emerald) filter, may be a Foveon X3 sensor, or may use separate charge-coupled devices, one for each color. Unless specifically stated otherwise, the term "sensor" is used herein for the combination of the filter, if any, and photosensor, while the term "photosensor" refers specifically to a pixel array that detects light. The term "sensor," however, is intended to encompass light sensing devices lacking a filter layer.

Image data, such as the wavelength of light detected by the photosensor, may be electronically conveyed via a pixel-processing path or other appropriate bus or connection to a processor. Alternatively, the image data may be stored in a memory or storage device before being conveyed to the processor. In either case, the processor uses the image data to construct a full-color image. As part of this process, the processor (which may be dedicated to image processing or encompass other functions) may adjust the color values of the image data or otherwise manipulate the image data. The final full-color image may be outputted to a display either integrated into or outside of the imaging device. Likewise, the final image may be made available for printing or storage either within or outside of the imaging device.

Returning to the discussion of FIG. 1, the circular portion 105 of the dichroic filter 100 permits all colors of light to pass therethrough and be detected by the appropriate pixels of the sensor. Thus, image sensing pixels located beneath the circular segment 105 detect light and images normally.

The annular portion 110 of the dichroic filter, however, permits only blue light to pass therethrough. The annular portion 110 may be a dichroic mirror permitting only blue light to pass therethrough but reflecting other colors of light. The annular portion 110 may be coated with an appropriate optical coating to form the dichroic mirror. Alternatively, the annular portion 110 may be absorptive rather than reflective, such that the annular portion absorbs all non-blue wavelengths of light. The annular portion 110 may be made of glass, plastic or any other suitable material. Any other suitable filter may be employed.

Figure 4:
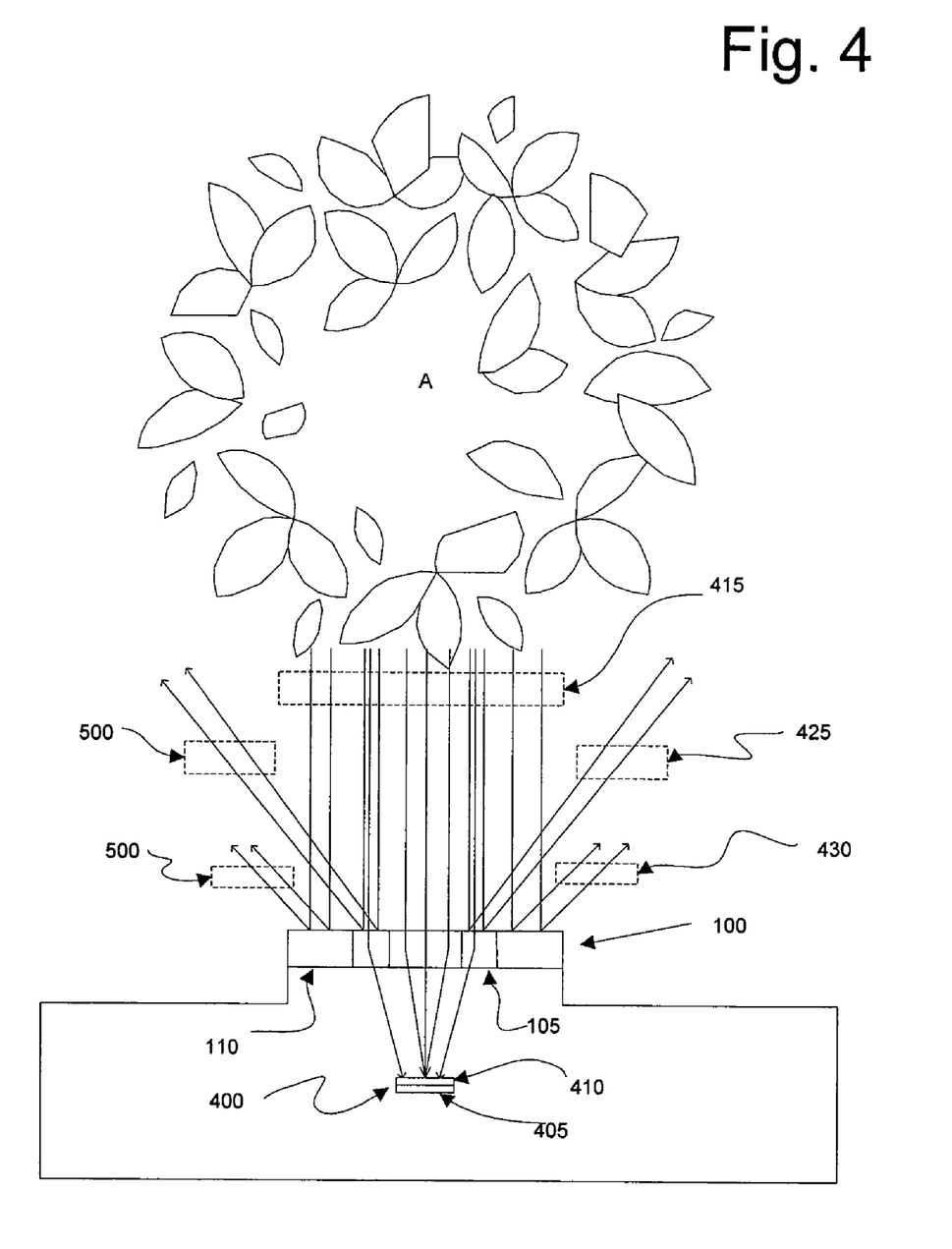
FIG. 4 is a cross-sectional side view of the embodiment of FIG. 1, taken along line 4-4 of FIG. 1.

Presuming the sensor underlies and/or is optically coupled to the dichroic filter 100, it may be appreciated that the sensor detects red, green and blue light. Given that each pixel of the sensor detects only a single color/spectrum of light, one may think of the sensor as having a first area detecting red light, a second area detecting green light and a third area detecting only blue light. The first, second and third areas are equal to one another and overlap for all practical purposes, occupying the entirety of the sensor. Because the interior portion 105 the dichroic filter 100 permits all light to pass through, the area of the sensor receives all wavelengths of light. However, because the annular portion 110 of the dichroic filter 100 permits only blue light to pass therethrough, the amount of blue light reaching the sensor is relatively greater than if the annular portion 110 were not present. "Area" here is measured by the outer bounds of the pixels detecting a given light spectrum without reference to the density of such pixels on the photosensor. That is, the fact that a sensor employing a Bayer filter permits denser detection of green light within a given region than red light is irrelevant for purposes of this definition. It should be noted that FIGS. 2 and 4 depict the sensor and filter/aperture in an illustrative form only; such elements are not drawn to scale or fixed position. Further, the light in these figures (shown by the arrows) converges on the sensor in the manner described above.

Essentially, the dichroic filter 100 separates the lens on which it is placed (or which it forms) into a first and second aperture. The first aperture is defined by the circular segment 105, passes all wavelengths of light and has a first f-number. The second aperture is defined by the combination of the circular segment and annular portion 110, passes only blue light and has an f-number lower than that of the first aperture. Accordingly, the sensor underlying the dichroic filter creates red and green images having high resolutions and a blue image having a lower resolution, but a higher signal-to-noise ratio ("signal level"). The red, green and blue images may be referred to herein as "component images."

As known to those skilled in the art, color data from the three images may be used to interpolate and create a single full-color image. Typically, the created image's resolution and signal level is derived from the signal noises and resolutions of the red, green and blue images. Generally, the luminance resolution of the full-color image is expressed by the same formula previously discussed. Accordingly, decreases in the resolution of the blue component of the full-color image (e.g., in the blue image registered by the photosensor) have a relatively small overall effect on the full-color image's resolution.

By contrast, the full-color image's signal level is dependent on the signal levels of each of the red, green and blue component images. Thus, an increase in the blue signal level, which corresponds to less noise in the blue image, increases the signal level of the full-color image approximately as much as an increase in the red or green signal levels. Such increase may be obtained by increasing the aperture size of only the blue image, as discussed herein.

Given the relatively small impact of the blue component image on resolution but its equal contribution to signal level, a tradeoff of blue image resolution for blue image signal level may be desirable, thereby ultimately creating a full-color image having a relatively minor resolution loss but a significant signal level gain. The embodiment shown in FIG. 1 accomplishes this by forming the red and green images with a slow f-number lens, thereby providing high resolution, and forming the blue image with a fast f-number lens, thereby providing lower resolution but higher signal level. It should be understood that the terms "fast," "slow," "high" and "lower" are used relative to one another.

The exact values of the resolution loss and signal level gain may vary from embodiment to embodiment and image to image based on a number of factors, such as the exact geometry of the dichroic aperture, the color and intensity of light sensed by the photosensor, the target capture din the image, quality of the electronics in the image capture device incorporating the dichroic aperture and/or photosensor, and so forth. Accordingly, exact values are not set forth herein.

FIG. 4 depicts a cross-sectional side view of the dichroic aperture and photosensor array discussed with respect to FIG. 1, taken along line 4-4 of FIG. 1. With reference to FIG. 1 and FIG. 4, the dichroic filter 100 is divided into various sections having different transmissive properties such that portions of the sensor 400 associated with each of the filter portions receive light of varying wavelengths. The sensor 400 is located beneath the dichroic filter and generally senses the light passing through the various segments of the filter. The sensor may be made of a Bayer array 410 placed atop a light-sensitive array 405. The light-sensitive array 405, in turn, may be divided into multiple light-sensitive pixels. Thus, the composition of the photosensor 400 is similar to that described with respect to the photosensor 200 of FIG. 2.

As an example, presume white light 415 made up of various wavelengths impacts the dichroic filter 100. The center segment 105 of the dichroic filter 100 does not filter any wavelengths of visible light. Accordingly, all wavelengths of light passing through that portion of the filter and impacting the photosensor 400 can be measured and used to create the red, green and blue component images.

By contrast, the dichroic annular portion 110 reflects all non-blue light 420, thus permitting only blue light 425 to pass therethrough. This blue light 425 may fall upon, and be sensed by, the sensor 400. In this manner, the red and green component images may be formed by the photosensor 400 with higher resolution and lower signal level, while the blue image is formed with lower resolution and higher signal level.

Figure 5:
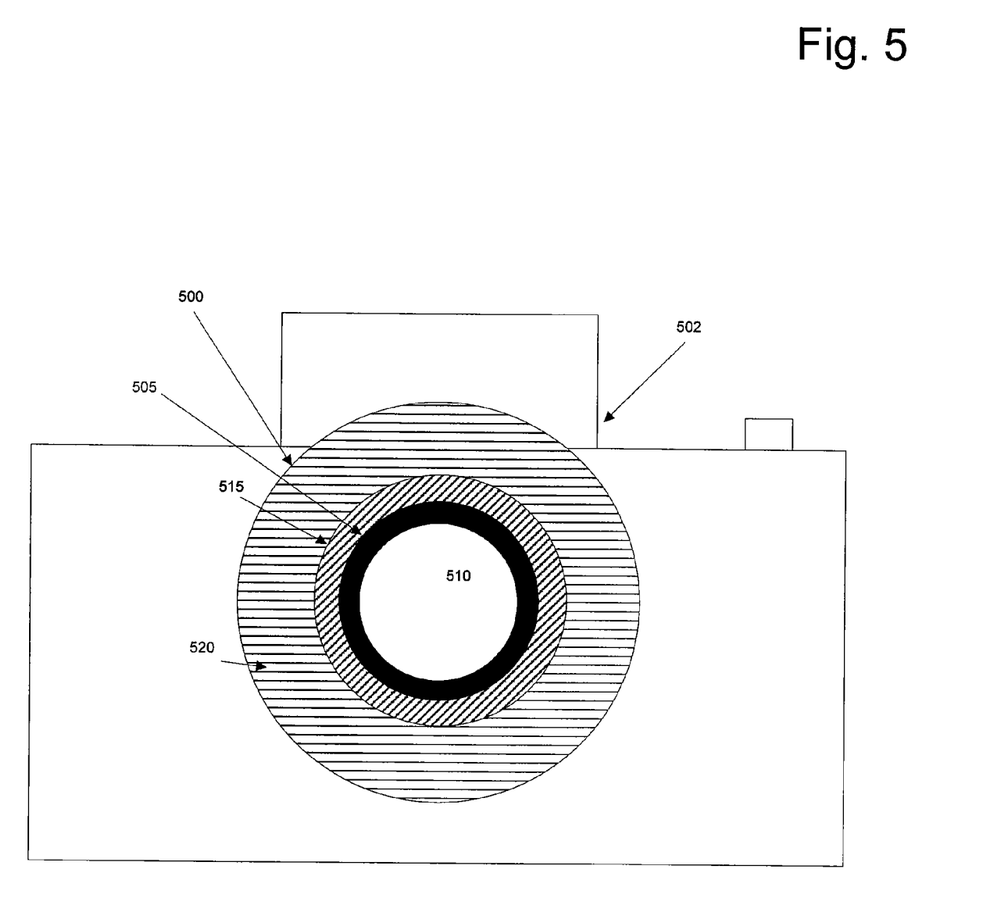
FIG. 5 is a top-down view of a second embodiment of the present invention.

FIG. 5 is a top-down view of an alternative embodiment of a filter or lens for an imaging device. This embodiment 500 is similar to the dichroic filter of FIG. 1 but instead adds a second dichroic annular portion 505 and may thus be considered a trichroic filter. As with the filter shown in FIG. 1, the inner portion 510 permits light of all wavelengths to pass therethrough and the outer ring-shaped portion permits 515 permits only blue light to pass. The second annular portion 505 is a dichroic mirror permitting only red and blue light to pass therethrough. It is conceptually similar to the blue-filtering outer portion 515 or the annular segment 110 of the dichroic filter shown in FIG. 1 and may be constructed in a similar fashion. That is, the second annular portion 505 may be a dichroic mirror reflecting all green light or may be absorptive of green wavelengths.

Essentially, the trichroic filter, in combination with an appropriate photosensor, creates a green composite image, a red composite image having higher signal level and lower resolution than the green image, and a blue composite image having higher signal level and lower resolution than the red image. This may enhance signal level even more than the dichroic filter in certain applications while maintaining a relatively small negative change in luminance resolution, given the effect of each color channel on luminance shown, as expressed by the formula discussed above for expressing the luminance resolution of a full-color image.

Although this discussion generally deals with electronic imaging devices, it should be appreciated that the principles set forth herein may be applied to film-based imaging devices such as a standard film camera. Likewise, the exact type of photosensor, filter layer and/or dichroic coating have not been specified insofar as they may vary between embodiments. Accordingly, the proper scope of protection is defined by the following claims.

I claim:

1. A filter for a camera, comprising:
    a first aperture permitting a first set of wavelengths to pass therethrough; and
    a second aperture adjacent the first aperture, the second aperture permitting only a subset of the first set of wavelengths to pass therethrough;
    wherein the second aperture encircles the first aperture.

2. The filter of claim 1, wherein the first set of wavelengths comprises approximately 400 to 750 nm wavelengths.

3. The filter of claim 2, wherein the subset of the first set of wavelengths comprises approximately 400-495 nm wavelengths.

4. The filter of claim 1, wherein the second aperture forms a dichroic mirror.

5. The filter of claim 4, further comprising a third aperture encircling the second aperture and forming a second dichroic mirror.

6. The filter of claim 5, wherein the subset of the first set of wavelengths comprises red and blue light.

7. The filter of claim 6, wherein the third aperture passes only blue light therethrough.

8. The filter of claim 1, wherein the second aperture absorbs at least a second subset of the first set of wavelengths.

9. An electronic imaging device, comprising:
    a photosensor; and
    an aperture overlying the photosensor, the aperture comprising:
        a first segment defining a first set of light-transmissive properties; and
        a second segment defining a second set of light-transmissive properties; wherein
    the first segment permits a first band of wavelengths to be detected by the photosensor; and
    the second segment permits a second band of wavelengths to be detected by the photosensor.

10. The electronic imaging device of claim 9, wherein the photosensor comprises:
    a grid of light-sensitive pixels; and
    a filter array overlying at least a portion of the grid.

11. The electronic imaging device of claim 10, wherein the filter array is a Bayer filter.

12. The electronic imaging device of claim 9, wherein:
    the first band of wavelengths comprises white light; and
    the second band of wavelengths comprises blue light.

13. The electronic imaging device of claim 12, wherein the aperture further comprises a third segment defining a third set of light-transmissive properties and permitting only red and blue light to pass therethrough.

14. The electronic inaging device of claim 13, wherein:
    the third segment encircles the first segment; and
    the second segment encircles the third segment.

15. The electronic imaging device of claim 14, wherein the second and third segments define dichroic mirrors.

16. The electronic imaging device of claim 14, wherein:
    the second segment reflects all non-blue light; and
    the third segment reflects all green light.

* * * * *

UNITED STATES PATENT AND TRADEMARK OFFICE
CERTIFICATE OF CORRECTION

| | | |
|---|---|---|
| PATENT NO. | : 7,881,603 B2 | Page 1 of 1 |
| APPLICATION NO. | : 12/239547 | |
| DATED | : February 1, 2011 | |
| INVENTOR(S) | : David S. Gere | |

It is certified that error appears in the above-identified patent and that said Letters Patent is hereby corrected as shown below:

In column 8, line 27, in Claim 14, delete "inaging" and insert -- imaging --, therefor.

Signed and Sealed this
Eighth Day of November, 2011

David J. Kappos
*Director of the United States Patent and Trademark Office*